(12) United States Patent
Fujimoto et al.

(10) Patent No.: US 9,627,877 B2
(45) Date of Patent: Apr. 18, 2017

(54) CONTROL SYSTEM AND METHOD FOR NUCLEAR POWER FACILITY

(75) Inventors: Hiroshi Fujimoto, Tokyo (JP);
Hironobu Shinohara, Tokyo (JP);
Yasutake Akizuki, Tokyo (JP); Toshiki Fukui, Tokyo (JP); Yuichi Tanaka, Tokyo (JP); Shinji Kiuchi, Tokyo (JP);
Hiroshi Shirasawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 436 days.

(21) Appl. No.: 13/876,775

(22) PCT Filed: Sep. 13, 2011

(86) PCT No.: PCT/JP2011/070903
§ 371 (c)(1),
(2), (4) Date: Mar. 28, 2013

(87) PCT Pub. No.: WO2012/049935
PCT Pub. Date: Apr. 19, 2012

(65) Prior Publication Data
US 2013/0204453 A1 Aug. 8, 2013

(30) Foreign Application Priority Data
Oct. 12, 2010 (JP) ................. 2010-230077

(51) Int. Cl.
*G05D 3/12* (2006.01)
*G05D 5/00* (2006.01)
(Continued)

(52) U.S. Cl.
CPC ................. *H02H 3/05* (2013.01); *G21D 3/04* (2013.01); *G21D 3/001* (2013.01); *Y02E 30/40* (2013.01)

(58) Field of Classification Search
CPC ............ H02H 3/05; G21D 3/04; G21D 3/001; Y02E 30/40
(Continued)

(56) References Cited

U.S. PATENT DOCUMENTS 4,080,251 A * 3/1978 Musick .......................... 376/217
4,427,620 A * 1/1984 Cook .................... F22B 35/004
376/216

(Continued)

FOREIGN PATENT DOCUMENTS

JP 60-128908 * 7/1985
JP 60-128908 A 7/1985
(Continued)

OTHER PUBLICATIONS

English Translation of Written Opinion of PCT/JP2011/070903, mailing date of Dec. 6, 2011.
(Continued)

*Primary Examiner* — Ziaul Karim
(74) *Attorney, Agent, or Firm* — Westerman, Hattori, Daniels & Adrian, LLP

(57) ABSTRACT

A nuclear power control system includes: a safety protection apparatus which outputs a first safety mode operating signal while outputting a first unsafety mode operating signal; a CCF apparatus that outputs a second safety mode operating signal; and a signal input/output circuit that is connected to the safety protection apparatus and the CCF apparatus. The signal input/output circuit includes an OR circuit that outputs a third safety mode operating signal based on the presence or absence of an input of the first safety mode operating signal and the second safety mode operating signal; a NOT circuit that is connected to the output side of the OR circuit; and an AND circuit that outputs a third
(Continued)

unsafety mode operating signal, and the presence and absence of an input of a first unsafety mode operating signal.

8 Claims, 2 Drawing Sheets

(51) Int. Cl.
    *G05D 9/00*     (2006.01)
    *G05D 11/00*     (2006.01)
    *H02H 3/05*     (2006.01)
    *G21D 3/04*     (2006.01)
    *G21D 3/00*     (2006.01)

(58) Field of Classification Search
    USPC ............ 700/292–298; 376/246–259; 702/40, 702/181
    See application file for complete search history.

(56) References Cited

U.S. PATENT DOCUMENTS

| | | | | |
|---|---|---|---|---|
| 4,804,515 A | * | 2/1989 | Crew | G06F 11/16 376/215 |
| 4,977,529 A | * | 12/1990 | Gregg | G09B 9/00 376/245 |
| 6,292,523 B1 | * | 9/2001 | Senechal | G05B 9/03 376/215 |
| 2004/0136487 A1 | * | 7/2004 | Shin et al. | 376/259 |
| 2007/0185700 A1 | * | 8/2007 | Izumi | G21C 17/00 703/14 |
| 2012/0323341 A1 | * | 12/2012 | Hayashi et al. | 700/1 |

FOREIGN PATENT DOCUMENTS

| | | |
|---|---|---|
| JP | 7-167987 A | 7/1995 |
| JP | 8-233990 A | 9/1996 |
| JP | 09-145893 A | 6/1997 |
| JP | 10-186087 A | 7/1998 |
| JP | 2002-525615 A | 8/2002 |
| SU | 847266 A1 | 7/1981 |
| WO | 98/56008 A1 | 12/1998 |
| WO | 00/17888 A1 | 3/2000 |

OTHER PUBLICATIONS

Extended European Search Report dated Feb. 19, 2014, issued in European Patent Application No. 11832373.2, (8 pages).
Japanese Decision to Grant a Patent dated Dec. 2, 2014, issued in Japanese Application No. 2010-230077; w/ English translation. (3 pages).
International Search Report for PCT/JP2011/070903, mailing date of Dec. 6, 2011.
Written Opinion of PCT/JP2011/070903, mailing date of Dec. 6, 2011.
Official Communication under Rule 71(3) EPC (Intention to Grant) dated Jan. 29, 2016, issued in counterpart European Patent Application No. 11 832 373.2. (33 pages).
Second Official Communication under Rule 71(3) EPC dated Jun. 3, 2016, issued in counterpart European Patent Application No. 11 832 373.2. (7 pages).

* cited by examiner

CONTROL SYSTEM AND METHOD FOR NUCLEAR POWER FACILITY

FIELD

The present invention relates to a control system for a nuclear power facility that operates an apparatus provided in the nuclear power facility to a safety mode when an abnormality occurs in the nuclear power facility.

BACKGROUND

A digital plant protection system of a nuclear power plant disclosed in Patent Literature 1 has been known as a control system for a nuclear power facility. The digital plant protection system includes a main control room, a remote shutdown panel, and an apparatus control system processor. The main control room is connected to the apparatus control system processor, and it is possible to operate an apparatus of an emergency response system provided in the nuclear power plant by transmitting a signal from the main control room to the apparatus control system processor. In addition, the remote shutdown panel is connected to the apparatus control system processor, and it is possible to manually operate an apparatus of an emergency response system provided in the nuclear power plant by transmitting a signal from the remote shutdown panel to the apparatus control system processor when an operator may not stay in the main control room. Then, the operated apparatus of the emergency response system carries out an emergency response such as a shutdown of a nuclear reactor and the like.

Incidentally, an apparatus provided in a nuclear power facility is divided into a safety protection apparatus and a normal apparatus (non-safety protection apparatus). The safety protection apparatus is an apparatus that operates the nuclear power facility to a safety mode when an abnormality occurs, and the normal apparatus is an apparatus that controls the nuclear power facility during a normal operation. When the safety protection apparatus is a digital apparatus, it is assumed that a defect such as a common cause failure occurs in the safety protection apparatus. For this reason, the nuclear power facility is provided with a CCF apparatus by assuming an occurrence of a common cause failure of the safety protection apparatus. The CCF apparatus is operated as a normal apparatus. In this instance, the safety protection apparatus is designed so that operation guarantee increases in proportion to the CCF apparatus which is a normal apparatus. For this reason, it is needed to be configured such that a signal output from the safety protection apparatus is prior to a signal output from the normal apparatus so that the signal output from the safety protection apparatus is not inhibited by a signal output from the CCF apparatus in regulation.

Herein, for example, when an apparatus provided in a main control room is the safety protection apparatus, and a remote shutdown panel is the CCF apparatus in a conventional digital plant protection system, a signal output from the safety protection apparatus and a signal output from the CCF apparatus are transmitted to an apparatus control system processor. In this instance, there is a concern that the signal output from the safety protection apparatus may be inhibited by the signal output from the CCF apparatus.

Hence, an object of the invention is to provide a control system for a nuclear power facility capable of operating an apparatus provided in the nuclear power facility to a safety mode without inhibiting a signal output from a safety main control device even when a signal is output from a normal auxiliary control device.

CITATION LIST

Patent Literature

Patent Literature 1: Japanese National Publication of International Patent Application No. 2002-525615

SUMMARY

Technical Problem

Solution to Problem

A control system for a nuclear power facility according to the present invention includes: a safety main control device that outputs a first safety mode operating signal which operates an apparatus provided in the nuclear power facility to a safety mode when an abnormality occurs in the nuclear power facility, and outputs a first unsafety mode operating signal which operates the apparatus to an unsafety mode when the nuclear power facility normally operates; a normal auxiliary control device that outputs a second safety mode operating signal which operates the apparatus to a safety mode when an abnormality occurs in the nuclear power facility, and assists the main control device; and an operating signal input/output unit to which various operating signals output from the main control device and the auxiliary control device are input, and which outputs a third safety mode operating signal that operates the apparatus to a safety mode or a second unsafety mode operating signal that operates the apparatus to an unsafety mode based on the input various operating signals, wherein the operating signal input/output unit includes an OR circuit capable of outputting the third safety mode operating signal based on the presence or absence of an input of the first safety mode operating signal, and the presence or absence of an input of the second safety mode operating signal, a NOT circuit connected to an output side of the OR circuit, and is capable of negating and outputting the presence or absence of an input of the third safety mode operating signal, and an AND circuit capable of outputting the second unsafety mode operating signal based on the presence or absence of an input of a signal output from the NOT circuit, and the presence or absence of an input of the first unsafety mode operating signal.

According to this configuration, when the normal auxiliary control device outputs the second safety mode operating signal to the OR circuit without the safety main control device outputting the first safety mode operating signal to the OR circuit due to a malfunction during an occurrence of abnormality of the nuclear power facility, the first safety mode operating signal is not input to the OR circuit, and the second safety mode operating signal is input to the OR circuit. In this case, the OR circuit may output the third safety mode operating signal. In this way, the operating signal input/output unit may cause the second safety mode operating signal from the normal auxiliary control device to be prioritized without inhibiting the first safety mode operating signal from the safety main control device. On the other hand, when the safety main control device normally operates and outputs the first safety mode operating signal to the OR circuit, and the normal auxiliary control device outputs the second safety mode operating signal to the OR circuit, the first safety mode operating signal is input to the OR circuit, and the second safety mode operating signal is input to the OR circuit. In this case, the OR circuit may output the third safety mode operating signal. In this way, the operating signal input/output unit may output the first safety mode operating signal from the safety main control device without being inhibited by the second safety mode operating signal from the normal auxiliary control device. In addition, even when the main control device outputs the first unsafety mode operating signal to the AND circuit due to a malfunction during an occurrence of abnormality of the nuclear power facility, the third safety mode operating signal output from the OR circuit is input to the AND circuit as no input by passing through the NOT circuit. For this reason, the AND circuit may block the first unsafety mode operating signal by the signal corresponding to the absence of an input from the NOT circuit. Thus, the operating signal input/output unit may output the second unsafety mode operating signal based on the presence or absence of an output of the third safety mode operating signal.

In this case, it is preferable that the auxiliary control device includes an automatic auxiliary control unit capable of automatically outputting the second safety mode operating signal when an abnormality occurs in the nuclear power facility, a manual auxiliary control unit capable of manually outputting the second safety mode operating signal, and an auxiliary side OR circuit capable of outputting the second safety mode operating signal based on the presence or absence of an input of the second safety mode operating signal output from the automatic auxiliary control unit, and the presence or absence of an input of the second safety mode operating signal output from the manual auxiliary control unit.

According to this configuration, it is possible to automatically or manually output the second safety mode operating signal output from the auxiliary control device. Thus, the auxiliary control device may be appropriately classified into a case of automatically outputting the second safety mode operating signal and a case of manually outputting the second safety mode operating signal depending on the intended use.

In this case, it is preferable that the manual auxiliary control unit includes an operation unit capable of manually outputting the second safety mode operating signal, signal output permission unit capable of outputting an enabling signal that permits an output of the second safety mode operating signal by the operation unit, and an auxiliary side AND circuit capable of outputting the second safety mode operating signal based on the presence or absence of an input of the second safety mode operating signal output from the operation unit, and the presence or absence of an input of the enabling signal.

According to this configuration, when the enabling signal is input, and the second safety mode operating signal is input, the manual auxiliary control unit may output the second safety mode operating signal. That is, when the enabling signal is not input, the manual auxiliary control unit may not output the second safety mode operating signal even when an operator erroneously operates an operating unit. Thus, the manual auxiliary control unit may reduce an erroneous operation of an operator by providing a signal output permission unit.

In this case, it is preferable that the signal output permission unit is a circuit breaker that supplies power to the manual auxiliary control unit, and the enabling signal is input to the auxiliary side AND circuit when power is supplied to the manual auxiliary control unit by the circuit breaker.

According to this configuration, the manual auxiliary control unit may cause the enabling signal to be input to the auxiliary side AND circuit when the circuit breaker supplies power to the manual auxiliary control unit, and may cause the enabling signal not to be input to the auxiliary side AND circuit when the circuit breaker blocks a power supply to the manual auxiliary control unit. Thus, an operator may simply input the enabling signal by operating the circuit breaker. In addition, a dedicated apparatus for inputting the enabling signal is not newly needed.

Advantageous Effects of Invention

According to a control system for a nuclear power facility of the invention, even when a signal is output from one of the main control device and the auxiliary control device, a signal output from the safety main control device is prioritized, so that a malfunction of the normal auxiliary control device may be suppressed and an apparatus provided in a nuclear power facility may be operated to a safety mode.

DESCRIPTION OF EMBODIMENTS

Hereinafter, a control system for a nuclear power facility according to the invention will be described with reference to the accompanying drawings. It should be noted that the invention is not limited to the embodiment below. In addition, elements in the embodiment described below include an element that may be easily substituted by those skilled in the art or substantially the same element.

Embodiment

Figure 1:
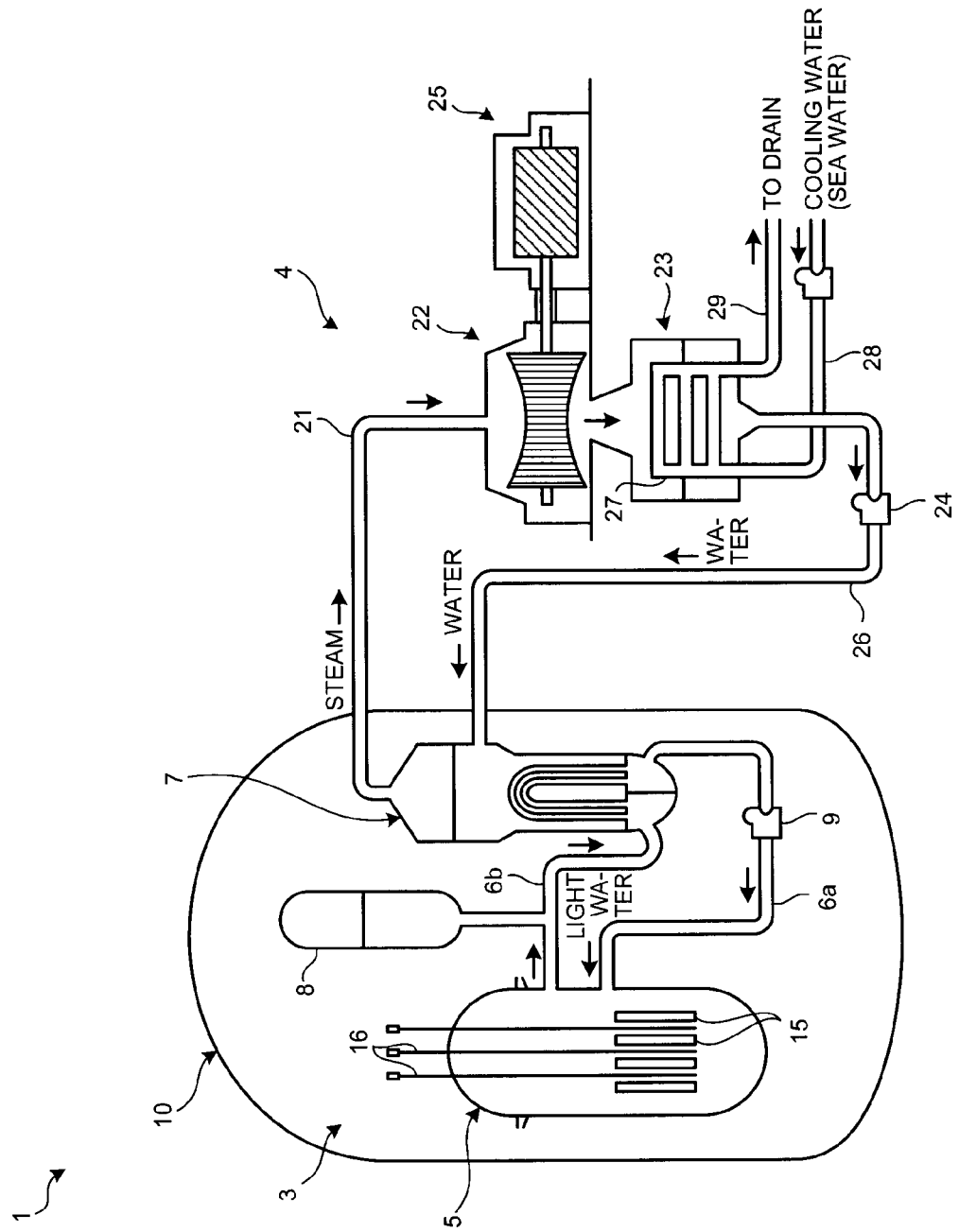
FIG. 1 is a schematic diagram schematically illustrating a nuclear power facility controlled by a control system according to the embodiment.

FIG. 1 is a schematic diagram schematically illustrating a nuclear power facility controlled by a control system according to the embodiment. A control system 40 of a nuclear power facility 1 according to the invention is a system that controls the nuclear power facility 1 including a nuclear reactor 5, and, for example, a pressurized water reactor (PWR) is used as the nuclear reactor 5. The nuclear power facility 1 using the PWR-type nuclear reactor 5 is configured by a primary cooling system 3 including the nuclear reactor 5, and a secondary cooling system 4 that exchanges heat with the primary cooling system 3. A primary coolant circulates in the primary cooling system 3, and a secondary coolant circulates in the secondary cooling system 4.

The primary cooling system 3 includes the nuclear reactor 5 and a steam generator 7 connected to the nuclear reactor 5 through coolant pipelines 6a and 6b formed from a cold leg 6a and a hot leg 6b. In addition, a pressurizer 8 is inserted in the hot leg 6b, and a coolant pump 9 is inserted in the cold leg 6a. The nuclear reactor 5, the coolant pipelines 6a and 6b, the steam generator 7, the pressurizer 8, and the coolant pump 9 are accommodated in a containment 10.

The nuclear reactor 5 is the PWR described in the foregoing, and the inside thereof is filled with the primary coolant. Multiple fuel assemblies 15 are accommodated in the nuclear reactor 5, and multiple control rods 16 that control nuclear fission of the fuel assemblies 15 are provided such that the multiple control rods 16 may be taken out of and put in each of the fuel assemblies 15.

When nuclear fission of the fuel assemblies 15 is started while a nuclear fission reaction is controlled by the control rods 16, thermal energy is generated due to the nuclear fission. The generated thermal energy heats the primary coolant, and the heated primary coolant is sent to the steam generator 7 through the hot leg 6b. On the other hand, the primary coolant sent from each steam generator 7 through the cold leg 6a flows in the nuclear reactor 5, and cools down the inside of the nuclear reactor 5.

The pressurizer 8 inserted in the hot leg 6b suppresses boiling of the primary coolant by pressurizing the primary coolant reaching a high temperature. In addition, the steam generator 7 vaporizes the secondary coolant to generate steam by causing the primary coolant reaching a high temperature and high pressure to exchange heat with the secondary coolant, and cools down the primary coolant reaching a high temperature and high pressure. Each coolant pump 9 circulates the primary coolant in the primary cooling system 3, pumps the primary coolant to the nuclear reactor 5 through the cold leg 6a from each steam generator 7, and pumps the primary coolant to each steam generator 7 through the hot leg 6b from the nuclear reactor 5.

Herein, a series of operation in the primary cooling system 3 of the nuclear power facility 1 will be described. When the primary coolant is heated by thermal energy generated by a nuclear fission reaction inside the nuclear reactor 5, the heated primary coolant is sent to each steam generator 7 through the hot leg 6b by each coolant pump 9. The primary coolant reaching a high temperature that passes through the hot leg 6b is suppressed from boiling by being pressurized by the pressurizer 8, and flows in each steam generator 7 in a state of reaching a high temperature and high pressure. The primary coolant reaching a high temperature and high pressure that flows in each steam generator 7 is cooled down by exchanging heat with the secondary coolant, and the cooled primary coolant is sent to the nuclear reactor 5 through the cold leg 6a by each coolant pump 9. Then, when the cooled primary coolant flows in the nuclear reactor 5, the nuclear reactor 5 is cooled down. That is, the primary coolant circulates between the nuclear reactor 5 and the steam generator 7. The primary coolant is light water used as a coolant and a neutron moderator.

The secondary cooling system 4 includes a turbine 22 connected to each steam generator 7 through a steam tubing 21, a steam condenser 23 connected to the turbine 22, and a feed pump 24 inserted in a water supplying pipe 26 that connects the steam condenser 23 with each steam generator 7. A power generator 25 is connected to the turbine 22 described above.

Herein, a series of operation in the secondary cooling system 4 of the nuclear power facility 1 will be described. When steam flows in the turbine 22 from each steam generator 7 through the steam tubing 21, the turbine 22 rotates. When the turbine 22 rotates, the power generator 25 connected to the turbine 22 generates electricity. Thereafter, steam flowing out of the turbine 22 flows in the steam condenser 23. A cooling pipe 27 is provided inside of the steam condenser 23. An intake pipe 28 that provides cooling water (for example, sea water) is connected to one side of the cooling pipe 27, and a drain pipe 29 that drains cooling water is connected to another side of the cooling pipe 27. The steam condenser 23 causes steam to return to liquid by cooling down steam flowing from the turbine 22 using the cooling pipe 27. The secondary coolant changing to liquid is sent to each steam generator 7 through the water supplying pipe 26 by the feed pump 24. The secondary coolant sent to each steam generator 7 changes to steam again by exchanging heat with the primary coolant in each steam generator 7.

Figure 2:
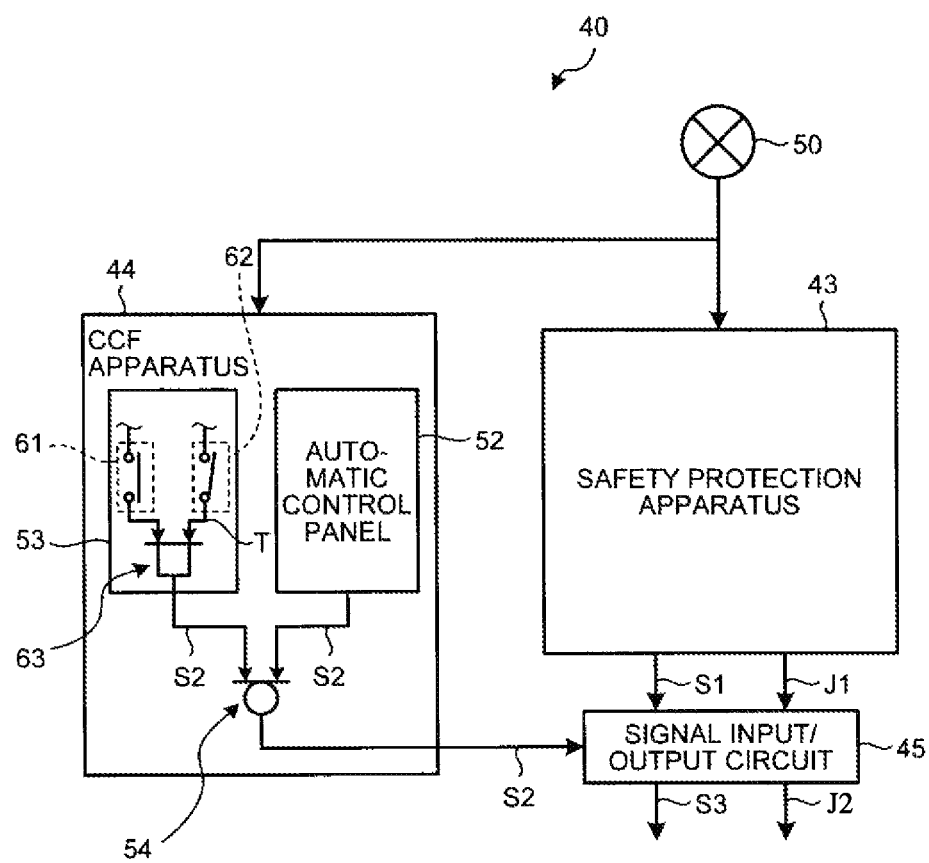
FIG. 2 is a configuration diagram of the control system of the nuclear power facility according to the embodiment.

FIG. 2 is a configuration diagram of a control system for a nuclear power facility according to the embodiment. A control system 40 that controls an operation of each apparatus such as various pumps described above and valves (not illustrated) arranged in the nuclear power facility 1 is provided in the nuclear power facility 1 configured as described in the foregoing. The control system 40 includes a central control apparatus (not illustrated), a plant control apparatus (not illustrated), a safety protection apparatus (main control device) 43, and a CCF apparatus (auxiliary control device) 44.

Although not illustrated, the central control apparatus is provided with a display device that displays an operation condition of the nuclear power facility 1, an operation device that operates the nuclear power facility 1, and the like. An operator operating the nuclear power facility 1 verifies an operation condition of the nuclear power facility 1 by viewing the display device, and appropriately operates the operation device, thereby operating the nuclear power facility 1. The plant control apparatus controls an operation of each apparatus and nuclear reactor 5 of the nuclear power facility 1 based on an operating signal output from the operation device of the central control apparatus.

As illustrated in FIG. 2, the safety protection apparatus 43 controls each apparatus provided in the nuclear power facility 1 so that the nuclear power facility 1 is safely suspended when an abnormality occurs in the nuclear power facility 1. The CCF apparatus 44 is a backup apparatus that assists the safety protection apparatus 43, and controls each apparatus provided in the nuclear power facility 1 so that the nuclear power facility 1 is safely suspended when a defect and the like occurs in the safety protection apparatus 43. Herein, a signal input/output circuit (operating signal input/output unit) 45 is connected to the safety protection apparatus 43 and the CCF apparatus 44. That is, the signal input/output circuit 45 is connected to the safety protection apparatus 43 and the CCF apparatus 44 at an input side thereof, and is connected to each apparatus provided in the nuclear power facility 1 at an output side thereof.

The safety protection apparatus 43 is a digital apparatus on which an arithmetic device such as a CPU and a memory device such as a HDD are mounted, and is an apparatus that may control a safety protection system of the nuclear power facility 1 by executing various programs stored in the memory device by the arithmetic device. The safety protection system is a functional system having functions of suspending a burnup of the nuclear reactor 5, cooling down the nuclear power facility 1, and preventing a leakage of a radioactive substance from the nuclear power facility 1. The safety protection apparatus 43 is reliably operable, and has a high operation guarantee so as to be operable in a strict environment.

Various detection sensors 50 provided in the nuclear power facility 1 are connected to the safety protection apparatus 43, and it is determined whether an abnormality occurs in the nuclear power facility 1 based on a result of detection obtained from the various detection sensors 50. When it is determined that an abnormality occurs in the nuclear power facility 1, the safety protection apparatus 43 outputs a first safety mode operating signal S1 that operates each apparatus to a safety mode to each apparatus. On the other hand, when it is determined that the nuclear power facility 1 normally operates, the safety protection apparatus 43 outputs a first unsafety mode operating signal J1 that operates each apparatus to an unsafety mode to each apparatus.

The CCF apparatus 44 is provided on the assumption that a defect such as a common cause failure occurs in the safety protection apparatus 43. The CCF apparatus 44 is an analog apparatus, and is configured by connecting each junction to each other through an electric wire using an electrical circuit part such as a switch and a relay. Herein, the common cause failure refers to a breakdown due to a common cause, and in particular, refers to a breakdown of hardware such as an arithmetic device used in a digital apparatus due to a common cause, or a failure of execution of software due to a common cause such as a bug.

The various detection sensors 50 described above are connected to the CCF apparatus 44, and it is determined whether an abnormality occurs in the nuclear power facility 1 based on a result of detection obtained from the various detection sensors 50 similarly to the safety protection apparatus 43. When it is determined that an abnormality occurs in the nuclear power facility 1, the CCF apparatus 44 outputs a second safety mode operating signal S2 that operates each apparatus to a safety mode to each apparatus. The CCF apparatus 44 is provided to assist the safety protection apparatus 43 when an abnormality occurs in the nuclear power facility 1 and thus, does not output an unsafety mode operating signal. In addition, the CCF apparatus 44 does not output the second safety mode operating signal S2 when the safety protection apparatus 43 normally operates even in a case in which an abnormality occurs in the nuclear power facility 1.

In addition, the CCF apparatus 44 includes an automatic control panel (automatic auxiliary control unit) 52 that may automatically output the second safety mode operating signal S2, a manual control panel (manual auxiliary control unit) 53 that may manually output the second safety mode operating signal S2, and a CCF side OR circuit (auxiliary side OR circuit) 54 connected to the automatic control panel 52 and the manual control panel 53.

The second safety mode operating signal S2 output from the automatic control panel 52 and the second safety mode operating signal S2 output from the manual control panel 53 are input to the CCF side OR circuit 54. The CCF side OR circuit 54 outputs the second safety mode operating signal S2 based on the presence or absence of an input of the second safety mode operating signal S2 output from the automatic control panel 52, and the presence or absence of an input of the second safety mode operating signal S2 output from the manual control panel 53. That is, the CCF side OR circuit 54 outputs the second safety mode operating signal S2 when the second safety mode operating signal S2 is input from at least one of the automatic control panel 52 and the manual control panel 53.

The automatic control panel 52 outputs the second safety mode operating signal S2 that operates each apparatus to a safety mode to each apparatus when it is determined that an abnormality occurs in the nuclear power facility 1 based on a result of detection obtained from the detection sensors 50.

The manual control panel 53 includes an operation unit 61 that may manually output the second safety mode operating signal S2, a circuit breaker 62 that may supply power to the manual control panel 53, and a CCF side AND circuit (auxiliary side AND circuit) 63 connected to the operation unit 61 and the circuit breaker 62.

The operation unit 61 outputs the second safety mode operating signal S2 by being operated by an operator, and does not output the second safety mode operating signal S2 when an operation by the operator is absent. Power is supplied to the manual control panel 53 when the circuit breaker 62 is operated to a power supplying side by an operator, and a power supply to the manual control panel 53 is shut off when the circuit breaker 62 is operated to a power shutoff side by an operator. In addition, when an operator operates the circuit breaker 62 to the power supplying side, an enabling signal T that permits an output of the second safety mode operating signal S2 by the operation unit 61 is input to the CCF side AND circuit 63. On the other hand, when an operator operates the circuit breaker 62 to the power shutoff side, the enabling signal T that permits an output of the second safety mode operating signal S2 by the operation unit 61 is not input to the CCF side AND circuit 63.

The second safety mode operating signal S2 output from the operation unit 61 and the enabling signal T output when the circuit breaker 62 is operated are input to the CCF side AND circuit 63. Then, the CCF side AND circuit 63 outputs the second safety mode operating signal S2 based on the presence or absence of an input of the second safety mode operating signal S2 output from the operation unit 61, and the presence or absence of an input of the enabling signal T. That is, the CCF side AND circuit 63 outputs the second safety mode operating signal S2 when the second safety mode operating signal S2 is input from the operation unit 61, and the enabling signal T is input.

When the second safety mode operating signal S2 is output from the manual control panel 53, an operator switches the circuit breaker 62 from the power shutoff side to the power supplying side, and then operates the operation unit 61, thereby outputting the second safety mode operating signal S2 from the manual control panel 53. In this way, when the operator does not switch the circuit breaker 62 to the power supplying side, the second safety mode operating signal S2 is not output even when the operation unit 61 is operated.

Herein, a series of operation of outputting the second safety mode operating signal S2 from the CCF apparatus 44 will be described. The CCF apparatus 44 outputs the second safety mode operating signal S2 when it is determined that an abnormality occurs in the nuclear power facility 1 based on a detection signal input from the detection sensors 50, or when the manual control panel 53 is operated by an operator. When an abnormality occurs in the nuclear power facility 1, the automatic control panel 52 of the CCF apparatus 44 outputs the second safety mode operating signal S2 to the CCF side OR circuit 54. On the other hand, when the manual control panel 53 is operated by an operator, the manual control panel 53 of the CCF apparatus 44 outputs the second safety mode operating signal S2 to the CCF side OR circuit 54. Then, the CCF side OR circuit 54 outputs the second safety mode operation signal S2 to the signal input/output circuit 45 when the second safety mode operation signal S2 is input from at least one of the automatic control panel 52 and the manual control panel 53.

An apparatus operated by the second safety mode operating signal S2 output from the automatic control panel 52 is partially different from an apparatus operated by the second safety mode operating signal S2 output from the manual control panel 53. That is, for example, an apparatus that is rapidly operated is targeted for an apparatus operated by the automatic control panel 52. On the other hand, for example, an apparatus having sufficient time until being operated is targeted for an apparatus operated by the manual control panel 53.

Figure 3:
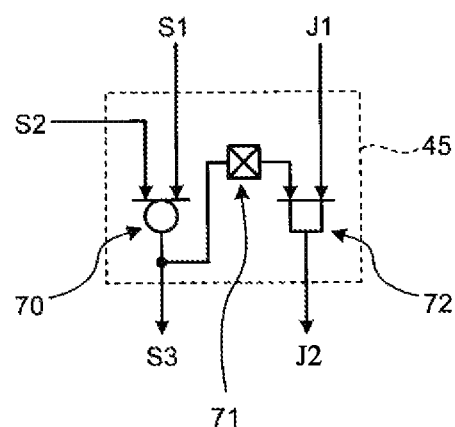
FIG. 3 is a configuration diagram of a signal input/output circuit.

FIG. 3 is a diagram illustrating a configuration of a signal input/output circuit. As illustrated in FIG. 3, a signal input/output circuit 45 is an interface among the safety protection apparatus 43, the CCF apparatus 44, and each apparatus. The first safety mode operating signal Sl, the first unsafety mode operating signal J1, and the second safety mode operating signal S2 are input to the signal input/output circuit 45. On the other hand, a third safety mode operating signal S3 and a second unsafety mode operating signal J2 are output from the signal input/output circuit 45.

The signal input/output circuit 45 includes an OR circuit 70, a NOT circuit 71, and an AND circuit 72. The OR circuit 70 is connected to the safety protection apparatus 43 and the CCF apparatus 44 at an input side thereof, and is connected to each apparatus at an output side thereof. The NOT circuit 71 is connected to an output side of the OR circuit 70 at an input side thereof, and is connected to an input side of the AND circuit 72 at an output side thereof. The AND circuit 72 is connected to the safety protection apparatus 43 and the NOT circuit 71 at an input side thereof, and is connected to each apparatus at an output side thereof.

The OR circuit 70 outputs the third safety mode operating signal S3 to each apparatus based on the presence or absence of an input of the first safety mode operating signal S1 output from the safety protection apparatus 43, and the presence or absence of an input of the second safety mode operating signal S2 output from the CCF apparatus 44. That is, the OR circuit 70 outputs the third safety mode operating signal S3 when at least one of the first safety mode operating signal S1 and the second safety mode operating signal S2 is input.

The NOT circuit 71 outputs, to the AND circuit 72, a signal negating the presence or absence of an input of the third safety mode operating signal S3 output from the OR circuit 70. That is, the NOT circuit 71 outputs a signal corresponding to the absence of an input to the AND circuit 72 when a signal corresponding to the presence of an input of the third safety mode operating signal S3 is input. On the other hand, the NOT circuit 71 outputs a signal corresponding to the presence of an input to the AND circuit 72 when a signal corresponding to the absence of an input of the third safety mode operating signal S3 is input, that is, when the third safety mode operating signal S3 is not input.

The AND circuit 72 outputs the second unsafety mode operating signal J2 to each apparatus based on the presence or absence of an input of the first unsafety mode operating signal J1 output from the safety protection apparatus 43, and the presence or absence of an input of a signal output from the NOT circuit 71. That is, the AND circuit 72 outputs the second unsafety mode operating signal J2 when the first unsafety mode operating signal J1 is input, and a signal corresponding to the presence of an input is input from the NOT circuit 71.

Herein, a series of operation of the signal input/output circuit 45 during a normal operation of the nuclear power facility 1, a series of operation of the signal input/output circuit 45 when the safety protection apparatus 43 operates during a period of time at which an abnormality occurs in the nuclear power facility 1, and a series of operation of the signal input/output circuit 45 when the CCF apparatus 44 operates during a period of time at which an abnormality occurs in the nuclear power facility 1 will be described respectively.

When the nuclear power facility 1 normally operates, only the first unsafety mode operating signal J1 is input, and the first safety mode operating signal S1 and the second safety mode operating signal S2 are not input to the signal input/output circuit 45. In this case, since the first safety mode operating signal S1 and the second safety mode operating signal S2 are not input to the OR circuit 70, the third safety mode operating signal S3 is not output. On the other hand, to the AND circuit 72, a signal negating the third safety mode operating signal S3 corresponding to the absence of an input, that is, a signal corresponding to the presence of an input is input from the NOT circuit 71, and the first unsafety mode operating signal J1 is input. For this reason, the AND circuit 72 outputs the second unsafety mode operating signal J2. As such, when the nuclear power facility 1 normally operates, the signal input/output circuit 45 does not output the third safety mode operating signal S3, and outputs the second unsafety mode operating signal J2 and thus, each apparatus operates to an unsafety mode.

When the safety protection apparatus 43 operates during a period of time at which an abnormality occurs in the nuclear power facility 1, the CCF apparatus 44 does not output the second safety mode operating signal S2. For this reason, to the signal input/output circuit 45, the first safety mode operating signal S1 is input, and the first unsafety mode operating signal J1 and the second safety mode operating signal S2 are not input. In this case, since the first safety mode operating signal 51 is input, and the second safety mode operating signal S2 is not input to the OR circuit 70, the third safety mode operating signal S3 is not output. To the AND circuit 72, a signal negating the input third safety mode operating signal S3 is input, that is, a signal is not input from the NOT circuit 71, and the first unsafety mode operating signal J1 is not input. For this reason, the AND circuit 72 does not output the second unsafety mode operating signal J2. Thus, the signal input/output circuit 45 outputs the third safety mode operating signal S3, and does not output the second unsafety mode operating signal J2. As such, when an abnormality occurs in the nuclear power facility 1, each apparatus operates to a safety mode.

When the CCF apparatus 44 operates during a period of time at which an abnormality occurs in the nuclear power facility 1, there is a fear that the safety protection apparatus 43 does not output the first safety mode operating signal S 1, and outputs the first unsafety mode operating signal J1 due to a defect such as a common cause failure. For this reason, to the signal input/output circuit 45, the first unsafety mode operating signal J1 and the second safety mode operating signal S2 may be input, and the first safety mode operating signal S1 may not be input. In this case, to the OR circuit 70, the first safety mode operating signal 51 is not input, and the second safety mode operating signal S2 is input and thus, the third safety mode operating signal S3 is output. To the AND circuit 72, a signal negating the input third safety mode operating signal S3 is input, that is, a signal is not input from the NOT circuit 71, and the first unsafety mode operating signal J1 is input. For this reason, the AND circuit 72 does not output the second unsafety mode operating signal J2. Thus, the signal input/output circuit 45 outputs the third safety mode operating signal S3, and does not output the second unsafety mode operating signal J2. As such, when an abnormality occurs in the nuclear power facility 1, each apparatus operates to a safety mode.

According to the above configuration, when the first safety mode operating signal S1 is output, the signal input/output circuit 45 may output the first safety mode operating signal S1 as the third safety mode operating signal S3. In addition, when the first safety mode operating signal S1 is not output, the signal input/output circuit 45 may output the second safety mode operating signal S2 as the third safety mode operating signal S3. In this way, when an abnormality occurs in the nuclear power facility 1, the signal input/output circuit 45 may output as the third safety mode operating signal S3 without inhibiting the first safety mode operating signal S1 in the OR circuit 70 thereof.

In addition, when the first unsafety mode operating signal J1 is output, the signal input/output circuit 45 may block the first unsafety mode operating signal J1 in response to the third safety mode operating signal S3 being output, and may output the first unsafety mode operating signal J1 as the second unsafety mode operating signal J2 in response to the third safety mode operating signal S3 failing to be output. Further, when the first unsafety mode operating signal J1 is not output, the signal input/output circuit 45 may block the second unsafety mode operating signal J2 in response to the third safety mode operating signal S3 being output, and may output the second unsafety mode operating signal J2 in response to the third safety mode operating signal S3 failing to be output. In this way, the signal input/output circuit 45 may output the second unsafety mode operating signal J2 based on the presence or absence of an output of the third safety mode operating signal S3.

In addition, the second safety mode operating signal S2 output from the CCF apparatus 44 may be automatically or manually output and thus, may be appropriately used depending on the intended use.

In addition, when the enabling signal T is not input to the CCF side AND circuit 63, the manual control panel 53 does not output the second safety mode operating signal S2 even when an operator erroneously operates the operation unit 61 and thus, an erroneous operation by the operator may be reduced.

INDUSTRIAL APPLICABILITY

As described in the foregoing, a control system for a nuclear power facility according to the invention is useful for a nuclear power facility including a safety protection apparatus and a CCF apparatus, and in particular, is suitable for a case of operating an apparatus provided in the nuclear power facility to a safety mode when an abnormality occurs.

REFERENCE SIGNS LIST

1 Nuclear power facility
3 Primary cooling system
4 Secondary cooling system
5 Nuclear reactor
7 Steam generator
8 Pressurizer
15 Fuel assemblies
16 Control rods
22 Turbine
25 Power generator
40 Control system
43 Safety protection apparatus
44 CCF apparatus
45 Signal input/output circuit
50 Detection sensors
52 Automatic control panel
53 Manual control panel
54 CCF side OR circuit
61 Operation unit
62 Circuit breaker
63 CCF side AND circuit
70 OR circuit
71 NOT circuit
72 AND circuit
S1 First safety mode operating signal
J1 First unsafety mode operating signal
S2 Second safety mode operating signal
S3 Third safety mode operating signal
J2 Second unsafety mode operating signal
T Enabling signal

The invention claimed is:

1. A control system for a nuclear power facility comprising:
a main control device arranged to output a first safety mode operating signal when judging that an abnormality occurs in the nuclear power facility, and arranged to output a first normal mode operating signal when judging that the nuclear power facility operates normally;
an auxiliary control device arranged to output a second safety mode operating signal when judging that an abnormality occurs in the nuclear power facility, and not to output the second safety mode operating signal even when judging that an abnormality occurs in the nuclear power facility if the main control device operates normally; and
an operating signal input/output unit arranged to receive the operating signals output from the main control device and the auxiliary control device, and arranged to output a third safety mode operating signal that operates an apparatus provided in the nuclear power facility to a safety mode or to output a second normal mode operating signal that operates the apparatus to a normal mode based on the received operating signals,
wherein the operating signal input/output unit includes:
an OR circuit configured to be connected to the main control device at one of an input side thereof, and configured to be connected to the auxiliary control device at an other of the input side thereof, the OR circuit is arranged to output the third safety mode operating signal to the apparatus when at least the first safety mode operating signal from the main control device, and the second safety mode operating signal are input,
a NOT circuit of which an input side is connected to an output side of the OR circuit, and arranged to output a negated third safety mode operating signal, and
an AND circuit of which one of an input side is connected to an output side of the NOT circuit, of which other of the input side is connected to the main control device, and of which output side is connected to the apparatus, the AND circuit is arranged to output the second normal mode operating signal to the apparatus based on an input of the negated third safety mode operating signal and of the first normal mode operating signal,
wherein the apparatus operates in the safety mode when the second normal mode operating signal is not input and the third safety mode operating signal is input, and
wherein the auxiliary control device does not output a normal mode operating signal which is for operating the apparatus in normal mode.

2. The control system according to claim 1, wherein the auxiliary control device includes:
an automatic auxiliary control unit arranged to automatically output the second safety mode operating signal when an abnormality occurs in the nuclear power facility,
a manual auxiliary control unit for manually outputting the second safety mode operating signal, and
an auxiliary side OR circuit arranged to output the second safety mode operating signal based on an input of the second safety mode operating signal, which is output from the automatic auxiliary control unit, and an input of the second safety mode operating signal, which is output from the manual auxiliary control unit.

3. The control system according to claim 2, wherein the manual auxiliary control unit includes:
an operation unit arranged to manually output the second safety mode operating signal,
signal output permission unit arranged to output an enabling signal that permits an output of the second safety mode operating signal by the operation unit, and
an auxiliary side AND circuit arranged to output the second safety mode operating signal based on an input of the second safety mode operating signal from the operation unit, and an input of the enabling signal.

4. The control system for the nuclear power facility according to claim 3, wherein the signal output permission unit is a circuit breaker that supplies power to the manual auxiliary control unit, and the enabling signal is input to the auxiliary side AND circuit when power is supplied to the manual auxiliary control unit by the circuit breaker.

5. A control method for a nuclear power facility comprising:
outputting, by a main control device, a first safety mode operating signal when judging that an abnormality occurs in the nuclear power facility, and outputting a first normal mode operating signal when judging that the nuclear power facility operates normally;
outputting, by an auxiliary control device, a second safety mode operating signal when judging that an abnormality occurs in the nuclear power facility, and not outputting the second safety mode operating signal even when judging that an abnormality occurs in the nuclear power facility if the main control device operates normally; and
receiving, by an operating signal input/output unit, the operating signals that are output from the main control device and the auxiliary control device, and outputting a third safety mode operating signal that operates an apparatus provided in the nuclear power facility to a safety mode or a second normal mode operating signal that operates the apparatus to a normal mode based on the received operating signals,
wherein the receiving and outputting by the operating signal input/output unit includes:
outputting, by an OR circuit configured to be connected to the main control device at one of an input side thereof, and configured to be connected to the auxiliary control device at an other of the input side thereof, the third safety mode operating signal to the apparatus when at least the first safety mode operating signal from the main control device, and the second safety mode operating signal are input,
outputting, by a NOT circuit of which an input side is connected to an output side of the OR circuit, a negated third safety mode operating signal, and
outputting, by an AND circuit of which one of an input side is connected to an output side of the NOT circuit, of which an other of the input side is connected to the main control device, and of which an output side is connected to the apparatus, the second normal mode operating signal to the apparatus based on an input of the negated third safety mode operating signal and of the first normal mode operating signal,
wherein the apparatus operates in the safety mode when the second normal mode operating signal is not input and the third safety mode operating signal is input, and
wherein the auxiliary control device does not output a normal mode operating signal which is for operating the apparatus in normal mode.

6. The control method according to claim 5, wherein the outputting and assisting by the auxiliary control device includes:
automatically outputting, by an automatic auxiliary control unit, the second safety mode operating signal when an abnormality occurs in the nuclear power facility,
manually, by a manual auxiliary control unit, outputting the second safety mode operating signal, and
outputting, by an auxiliary side OR circuit, the second safety mode operating signal based on an input of the second safety mode operating signal output from the automatic auxiliary control unit, and an input of the second safety mode operating signal output from the manual auxiliary control unit.

7. The control method according to claim 6, wherein the manually outputting by the manual auxiliary control unit includes
manually outputting, by an operation unit, the second safety mode operating signal,
outputting, by a signal output permission unit, an enabling signal that permits an output of the second safety mode operating signal by the operation unit, and
outputting, by an auxiliary side AND circuit, the second safety mode operating signal based on an input of the second safety mode operating signal output from the operation unit, and an input of the enabling signal.

8. The control method for the nuclear power facility according to claim 7, wherein the signal output permission unit is a circuit breaker for supplying power to the manual auxiliary control unit, and the enabling signal is input to the auxiliary side AND circuit when power is supplied to the manual auxiliary control unit by the circuit breaker.

* * * * *